United States Patent [19]

Bertram et al.

[11] Patent Number: 4,948,999
[45] Date of Patent: Aug. 14, 1990

[54] SELF-STARTING TWO-POLE SINGLE-PHASE SYNCHRONOUS MOTOR

[75] Inventors: Leo Bertram, Stolberg, Fed. Rep. of Germany; Romuald L. Bukoschek, Klagenfurt, Austria

[73] Assignee: U.S. Philips Corporation, New York, N.Y.

[21] Appl. No.: 318,507

[22] Filed: Mar. 2, 1989

Related U.S. Application Data

[63] Continuation of Ser. No. 593,173, Mar. 26, 1984, which is a continuation of Ser. No. 377,780, May 13, 1982, abandoned.

[30] Foreign Application Priority Data

May 21, 1981 [AT] Austria ............................ 2286/81

[51] Int. Cl.[5] ............................................ H02K 21/00
[52] U.S. Cl. ........................................ 310/162; 310/44; 310/156
[58] Field of Search ............ 310/40 MM, 49 R, 162, 310/163, 164, 165, 156, 44, 41, 254, 261; 335/303

[56] References Cited

U.S. PATENT DOCUMENTS

| | | | |
|---|---|---|---|
| 2,803,765 | 8/1957 | Timmerman | 310/156 |
| 2,909,685 | 10/1959 | Szabo | 310/163 |
| 3,317,766 | 5/1967 | Bensa | 310/163 |
| 3,317,872 | 5/1967 | Wullkopf . | |
| 3,375,384 | 3/1968 | Thees | 310/156 |
| 3,694,115 | 9/1972 | Steingrover . | |
| 3,872,334 | 3/1975 | Loubier | 310/44 |
| 3,891,879 | 6/1975 | Yamada | 310/44 |
| 4,048,548 | 9/1977 | Nakajima | 310/162 |
| 4,066,947 | 1/1978 | Nakajima | 310/49 R |
| 4,144,465 | 3/1979 | Nakajima | 310/156 |
| 4,162,418 | 7/1979 | Kawaki | 310/163 |
| 4,214,181 | 7/1980 | Nagahori | 310/40 MM |
| 4,361,790 | 11/1982 | Laesser | 310/49 R |
| 4,369,385 | 1/1983 | Malkin | 310/40 MM |
| 4,417,168 | 11/1983 | Miller | 310/156 |
| 4,536,230 | 8/1985 | Landa et al. . | |

FOREIGN PATENT DOCUMENTS

| | | | |
|---|---|---|---|
| 1488270 | 3/1974 | Fed. Rep. of Germany | 310/162 |
| 1017193 | 12/1952 | France . | |
| 2451620 | 3/1980 | France . | |
| 1403310 | 8/1975 | United Kingdom . | |

*Primary Examiner*—R. Skudy
*Attorney, Agent, or Firm*—Brian J. Wieghaus; David R. Treacy

[57] ABSTRACT

In a self-starting two-pole single-phase synchronous motor with a permanent magnetic rotor, which as a result of diametrical magnetization comprises two opposite pole faces on its circumference, the rotor is made of a plastics-bonded anisotropic magnetic material, the two opposite pole faces each being limited to an angular range of the rotor circumference starting from the rotor axis, which is smaller than 90°.

3 Claims, 1 Drawing Sheet

SELF-STARTING TWO-POLE SINGLE-PHASE SYNCHRONOUS MOTOR

This is a continuation of application Ser. No. 593,173, filed Mar. 26, 1984, which is a continuation of Application Ser. No. 377,780 filed May 13, 1982, now abandoned.

BACKGROUND OF THE INVENTION

The invention relates to a self-starting two-pole single-phase synchronous motor with a permanent-magnetic rotor, which rotor as a result of diametrical magnetization has two opposite magnetic poles faces on its circumference and is arranged between two limbs of a stator provided with an exciter coil, the ends of these limbs partly enclosing the rotor with arcuate stator pole faces arc, so that air gaps are formed.

Such a motor, whose principle is for example described in DE-AS 14 88 270, should be capable of providing a maximum power output with a high efficiency, while guaranteeing that the rotor starts correctly from its rest position. To ensure reliable starting it is necessary that the relevant rest position of the rotor differs from the angular positions of the rotor in which the driving torque passes through the value zero. These rotor positions, in which the driving torque is zero, occur when its magnetic field is directed transversely of the limbs of the stator, so that two such rotor positions are obtained, which positions are 180° spaced from each other in accordance with the diametrical magnetization but which are perfectly equivalent, because they only differ in respect of the orientation of the magnetic field. Consequently, such a rotor also has two rest positions, which are 180° spaced and which are also perfectly equivalent.

The angular deviation of the rest positions of the rotor, from those positions in which the driving torque passes through the value zero, is obtained in a known manner by designing the ends of the stator limbs so that different air gaps relative to the rotor are formed. For example, asymmetrically angularly displaced projections may be formed on the ends of the limbs. In conjunction with the magnetic field of the rotor this yields a so-called detent torque, which ensures that when the motor is disconnected from the a.c. line voltage the rotor occupies one of the two desired rest positions and does not remain in one of the two positions in which the driving torque passes through the value zero, which would prohibit self-starting.

In order to meet the desired power, efficiency and starting requirements, the rotors of such self-starting two-pole single-phase synchronous motors, which are for example employed in domestic appliances, such as citrus presses and the like, are manufactured from sintered anisotropic magnetic materials with a high residual induction, because the value of this induction is a measure of both the power output and the detent torque which can be achieved. Such sintered anisotropic magnetic materials, however, have the disadvantage that they are deformed substantially during sintering, so that rotors thus manufactured should be subjected to a finishing process. This process requires comparatively expensive grinding operations, because such materials are very hard. As a result of this, such synchronous motors become relatively expensive, and the cost restricts their use, especially in mass products.

SUMMARY OF THE INVENTION

It is an object of the invention to provide a self-starting two-pole single-phase synchronous motor of the type mentioned in the opening paragraph, which is simple and cheap to manufacture and despite this, meets the requirements of a high power output and a reliable starting behavior.

In accordance with the invention the rotor is made of a plastic-bonded anisotropic magnetic material and the two opposite pole faces are each limited to an angular range of the rotor circumference, about the rotor axis, which is smaller than 90°.

The invention is mainly based on the recognition that plastic bonded anisotropic magnetic materials can be processed relatively simply in a dimensionally stable manner and have no tendency to deform, so that the dimensions of the products manufactured with these materials are comparatively accurate and require no finishing, which reduces the manufacturing costs. As a result of the plastic component used for bonding, the amount of anisotropic magnetic material is reduced, which means that such rotors have a lower residual induction and thus a poor starting behavior.

In accordance with the invention, the starting problem is solved in that the two opposite pole faces of the rotor are each limited to an angular range of the rotor circumference, about the rotor axis, which is smaller than 90°. In the case of diametrical magnetization this results in distinct magnet poles with a field concentration at the pole faces, so that the detent torque is increased. This field concentration produces well-defined rest positions for the rotor, which ensure a correct starting.

In this respect it is to be noted that self-starting single-phase synchronous motors with rotors comprising a plurality of pole pairs, in which the opposite pole faces of a pole pair occupy a limited angular range of the rotor circumference about the rotor axis are already known, for example from U.S. Pat. No. 4,214,181. However, such rotors with a plurality of pole pairs and thus a plurality of directions of magnetization can only be manufactured from an isotropic magnetic material, which has a substantially lower residual induction than an anisotropic magnetic material, which can only be magnetized in a diametrical direction, so that synchronous motors with such rotors are only capable of delivering smaller power outputs. It is apparent that such synchronous motors are of a construction which differs inherently from the type mentioned in the opening paragraph and to which the present invention rotates, although the use of plastic-bonded anisotropic magnetic materials for the manufacture of magnets is known per se.

In practice it is found that for a synchronous motor in accordance with the invention it is particularly advantageous if the angular range is of the order of magnitude of 65°. This results in a very favorable starting behavior and a satisfactory power output.

BRIEF DESCRIPTION OF THE DRAWING

The invention will be described in more detail with reference to the drawing, which shows an embodiment of the invention to which it is not limited.

DESCRIPTION OF THE PREFERRED EMBODIMENT

Figure 1:
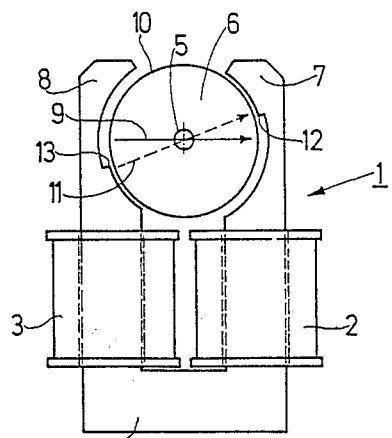
FIG. 1 is a plan view of a self-starting two-pole single-phase synchronous motor.

In FIG. 1 a self-starting two-pole single-phase synchronous motor is designated 1. This motor comprises a stator 4 provided with an exciter coil comprising two coil sections 2 and 3, and a rotor 6 which is rotatably journalled on a shaft 5, the bearing arrangement of the rotor, which may be constructed in known manner, not being shown for the sake of simplicity. The U-shaped stator 4 comprises limbs 7 and 8, which partly surround the rotor 6 in a circular arc, thus forming air gaps. The cylindrical rotor 6, which is made of a magnetizable permanent-magnetic material, is of the two-pole type, for which purpose it is diametrically magnetized in a radial direction, as is schematically represented by the arrow 9. Thus, on its circumferential surface 10 the rotor 6 has, diametrically opposite each other, a north pole and a south pole, which together constitute a pole pair. Thus two 180° spaced positions of the rotor 6 are obtained in which the driving torque of the synchronous motor passes through the value zero. These positions are reached when the magnetic field of the rotor 6 extends transversely of the limbs 7 and 8 of the stator 4, as is indicated for one position by the arrow 9 in FIG. 1. As a result of this, the rotor 6 also requires two specific rest positions which are also 180° spaced from each other, but which have an angular position which differs slightly from the rotor positions in which the driving torque is zero, in order to enable self-starting. Since the two positions of the rotor corresponding to zero driving torque and the two rest positions of the rotor are 180° spaced from each other, they are perfectly equivalent, so that only one of these positions need to be referred to.

In practice the angular deviation of the rest positions of the rotor 6, one of which is represented by the dashed arrow 11 in FIG. 1, from the rotor positions in which the driving torque is zero is of the order of magnitude of 10° to 25°, as is apparent from the orientation of the two arrows 9 and 11 in FIG. 1 relative to each other. These rest positions are obtained by correspondingly shaping the limbs 7 and 8 at their locations opposite the rotor 6, so that non-uniform air gaps are obtained, for which purpose, for example, projections 12 and 13 are formed on the limbs, as is shown in FIG. 1. Thus, in conjunction with the magnetic rotor field a so-called detent torque is obtained, which ensures that when the motor is disconnected from the a.c. line voltage the rotor 6 occupies one of the two predetermined rest positions and does not remain in a position in which the driving torque is zero, from which position self-starting would be impossible.

In such a known self-starting two-pole single-phase synchronous motor with permanent magnetic rotor, said rotor consists of a sintered anisotropic magnetic material, which gives rise to the problems described above, that the rotor must be subjected to a finishing operation. However, according to the invention the rotor is made of a plastic-bound or bonded anisotropic material. By the use of a plastic bonded anisotropic magnetic material for the rotor, the rotor is particularly easy to manufacture, because such a material has no tendency to deform. Therefore, such a rotor can be manufactured directly with absolutely stable dimensions, so that no finishing operation is necessary. As is known, the anisotropic permanent ferrite magnetic material may then, for example, be Ferroxdure (Trademark) and the plastic binder a thermoplastic such as "Polyamid 6" (Trademark).

By bonding the anisotropic magnetic material by means of a plastic, however, the portion of anisotropic magnetic material in the rotor is smaller than in a rotor made of an anisotropic magnetic material only. However, this means that the attainable residual induction is also reduced. This in particular has an adverse effect on the starting behavior of a synchronous motor. Therefore, plastic-bonded anisotropic materials are not inherently suitable for the manufacture of rotors for such synchronous motors. In order to overcome this problem, the two opposite pole faces of the rotor are each limited to an angular range of its circumference which is smaller than 90°, about the rotor axis, while in practice it is found to be particularly advantageous if the angular range is of the order of magnitude of 65°. In this way the magnetic field is concentrated at pole faces of smaller surface area, so that the detent torque increases and the starting behavior is improved considerably. By means of this step the influence of the smaller residual induction in the case of plastic-bonded anisotropic magnetic materials on the starting behavior of the synchronous motor is compensated for, so that again an absolutely reliable starting behavior is guaranteed.

Such a construction of the pole faces is obtained during the diametrical magnetization of the rotor, namely in that for magnetization a proportionally narrower magnetic field is employed, which only covers the desired angular range of the rotor circumference. In the rotor itself this magnetic field then expands again, so that the field distribution in its interior is non-homogeneous. This type of rotor magnetization is based on the recognition that such a non-homogeneous field can be formed in plastic-bonded anisotropic magnetic materials, because the particles to be magnetized can suitably orient themselves in the complete system without the formation of cracks in the material, as will be the case with sintered anisotropic magnetic materials under the same conditions.

Figure 2:
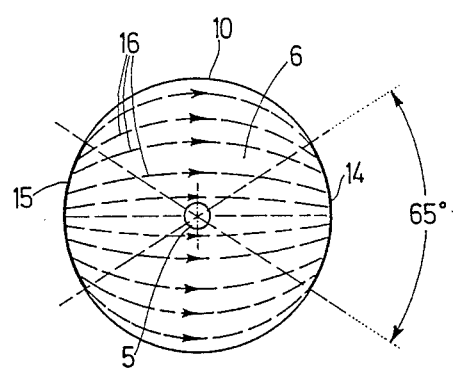
FIG. 2 shows the rotor of the synchronous motor of FIG. 1 on an enlarged scale, the magnetization of the rotor being represented schematically.

FIG. 2 illustrates such a magnetization of the rotor 6, the pole faces, which are limited to an angular range of the rotor circumference 10 starting from the rotor axis 5, being represented schematically by the heavier lines 14 and 15. The magnetization pattern inside the rotor 6 is represented by the broken lines 16. As can be seen, a field concentration is obtained on the diametrically opposed pole faces, which in the present case are limited to an angular range of the circumference of 65°.

Figure 3:
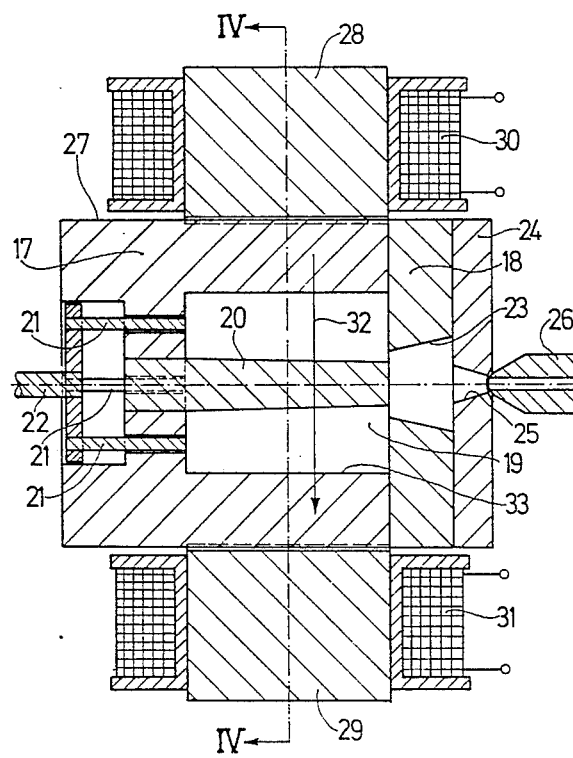
FIG. 3 is a longitudinal section of a tool for manufacturing a rotor as shown in FIG. 2.
Figure 4:
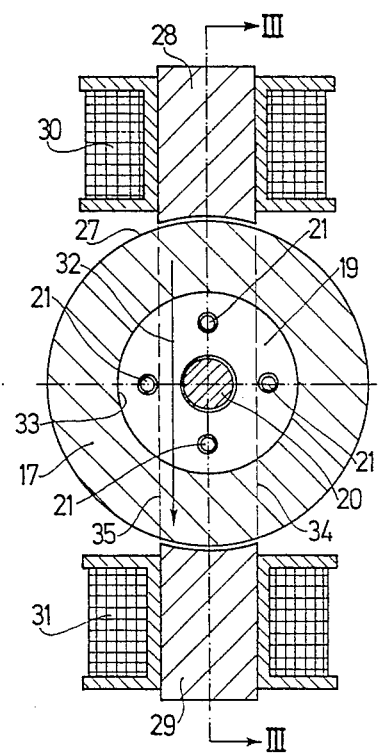
FIG. 4 shows the tool of FIG. 3 in a sectional view taken on the line IV—IV in FIG. 3.

To manufacture a rotor from a plastic-bonded anisotropic magnetic material any known method may be used, such as for example extrusion or pressing. In the present case it is found that for this purpose the injection-molding process, which is known, is simple and effective. As can be seen in FIGS. 3 and 4, a tool is used for this purpose which comprises a hollow cylindrical tool section 17 and a flat tool section 18, between which the tool parting face extends. In the hollow cylindrical tool section 17, whose cavity 19 defines the shape of the rotor, a conical insert 20 is arranged coaxially, which insert forms a bore in the finished rotor, into which bore the rotor shaft can be fitted. The tool section 17 further comprises ejectors 21 for ejecting the finished rotor, which ejectors are actuated by a slide 22. The tool section 18 has a bore 23, which adjoins a further bore 25 formed in a terminating portion 24, to which bore an injection nozzle 26 can be applied, from which the material to be processed reaches the cavity 19 of the tool section 17 through the bores 25 and 23.

Two diametrically opposed pole-shoes 28 and 29 adjoin the circumference 27 of the tool section 17, which pole shoes are each provided with a respective exciter coil 30 and 31. In this way a magnetic field can be built up between the pole shoes 28 and 29, which then extends diametrically in the direction of the arrow 32 through the tool which is made of a non-magnetic material, a north pole being formed at a location of the one pole shoe and a south pole at the location of the other pole shoe. As can be seen especially in FIG. 4, the width of the pole shoes 28 and 29 has been selected so that the homogeneous magnetic field extending from the pole shoes only covers a specific angular portion of the inner circumferential surface 33 of the tool section 17 which bounds the cavity 19, as is schematically represented by the broken lines 34 and 35. This defines the angular range of the rotor circumference, about the rotor axis, to which the pole faces are limited after magnetization. Magnetization of the rotor is effected directly during the injection-molding process, the individual particles of the anisotropic magnetic material being magnetized and being oriented in accordance with the magnetic field while the material injected into the cavity 19 of the tool is still in a plastic condition. This orientation is then maintained in the solid condition of the material.

As a result of said specific choice of the width of the pole shoes 28 and 29, the magnetization pattern of the rotor is shown in FIG. 2 is obtained. After the material has solidified by curing of the plastic component, the magnetic field is switched off and the tool 17, 18 is divided at the tool parting face, the material disposed in the bore 23 of the tool section 18 being separated from the material disposed in the cavity 19 of the tool section 17. Subsequently, the finished rotor located in the cavity 19 of the tool section 17 is ejected from the tool section by means of the ejectors 21, 21. The rotor 6 is thus completed, because a finishing operation is not required owing to the use of the plastic-bonded anisotropic magnetic material, because this material strictly conforms to the tool cavity.

As can be seen, the manufacture of a self-starting two-pole single-phase synchronous motor is simple and inexpensive by the use of this method, even through the motor has a high power output and a reliable starting behavior. The choice of the angular range of the rotor circumference to which the pole faces should be limited, within the specified range of less than 90°, is arbitrary for smaller angles but depends on the power rating of the synchronous motor. In principle the starting behavior improves towards smaller angles, but then the power rating decreases. As already stated, it is found in practice that an angular range of the order of magnitude of 65° is very favorable, because this results in an absolutely reliable starting behavior with a satisfactory power rating.

What is claimed is:

1. A self-starting two-pole single-phase synchronous motor, comprising:
   a stator having two stator-pole-forming limbs having stator pole faces, and an exciter coil, and
   a permanent magnet rotor defining a rotor axis and disposed between said stator pole faces, said limbs being arranged such that said pole faces define air gaps between the rotor and the stator, said rotor being magnetized diametrically so as to define two only opposite magnetic poles on its circumference,
   characterized in that said rotor comprises a plastic-bonded anisotropic magnetic material forming the permanent magnet, magnetized such that the rotor poles are opposite each other and each extend over an angular range, about the rotor axis, less than 90°.

2. A motor as claimed in claim 1, characterized in that the rotor poles each extend over an angle of approximately 65° about the rotor axis.

3. A motor as claimed in claim 1, characterized in that said rotor permanent magnet has a circular cylindrical circumference.

* * * * *